United States Patent [19]

Matheny et al.

[11] Patent Number: 4,864,828

[45] Date of Patent: Sep. 12, 1989

[54] AIRCRAFT ENGINE COMBUSTION LINER COOLING APPARATUS

[75] Inventors: Alfred P. Matheny, Jupiter; Thomas A. Auxier, Palm Beach Gardens, both of Fla.

[73] Assignee: The United States of America as represented by the Secretary of the Air Force, Washington, D.C.

[21] Appl. No.: 187,762

[22] Filed: Apr. 29, 1988

[51] Int. Cl.$^4$ .............................................. F23R 3/08
[52] U.S. Cl. ....................................... 60/757; 60/760
[58] Field of Search .................. 60/757, 760, 755, 758, 60/752; 165/161; 431/351, 352; 126/146; 110/180

[56] References Cited

U.S. PATENT DOCUMENTS

| | | | |
|---|---|---|---|
| 3,533,711 | 10/1970 | Kercher | 416/90 |
| 3,978,662 | 9/1976 | Du Bell et al. | 60/760 |
| 4,056,332 | 11/1977 | Meloni | 416/97 A |
| 4,104,874 | 8/1978 | Carvel et al. | 60/760 |
| 4,109,459 | 8/1978 | Ekstedt et al. | 60/39.66 |
| 4,291,681 | 9/1981 | Berringer | 165/161 |
| 4,339,925 | 7/1982 | Eggmann et al. | 60/760 |
| 4,380,906 | 4/1983 | Dierberger | 60/757 |
| 4,445,570 | 5/1984 | Retallick | 60/760 |
| 4,462,754 | 7/1984 | Schofield | 416/97 R |

FOREIGN PATENT DOCUMENTS 16116 3/1907 Norway ................................ 60/760

Primary Examiner—Louis J. Casaregola
Assistant Examiner—Timothy S. Thorpe
Attorney, Agent, or Firm—Robert L. Nathans; Donald J. Singer

[57] ABSTRACT

Aircraft engine cooling apparatus having a plurality of cooling gas inlet nozzles, producing first streams of cooling gas moving in a forward direction, a plurality of first direction reversal members for splitting the first streams into second and third streams straddling the nozzles, and substantially reversed in direction relative to the direction of the first streams, a plurality of second direction reversal members, positioned between pairs of adjacent nozzles, for again substantially reversing the directions of the second and third streams, while combining the second and third streams to form a fourth stream of laminar flow cooling film, and wherein adjacent pairs of the first direction reversal members have wall portions configured to form gradually diverging channels through which the fourth stream cooling film moves.

10 Claims, 1 Drawing Sheet

AIRCRAFT ENGINE COMBUSTION LINER COOLING APPARATUS

STATEMENT OF GOVERNMENT INTEREST

The invention described herein may be manufactured and used by or for the Government for governmental purposes without the payment of any royalty thereon.

BACKGROUND OF THE INVENTION

The present invention relates to the field of aircraft engine component cooling apparatus.

The combustor liner of a gas turbine engine presents major maintenance problems owing to the extremely high temperatures formed within the liner. In U.S. Pat. No. 4,380,906 to Dierberger, a plurality of annular louvers are positioned about the combustor liner. Cooling gas exiting from the compressor pass between an outer burner case and an outside wall of the combustor liner, such cooling gas passing through a twisted path and being emitted to form a cooling film at the underside of these liners. Cooling gas impinges upon a barrier which tends to cool the inside of the liner and exits to form a cooling film along the inside of the liner. A second annular louver configuration is positioned downstream and additional amounts of cooling gas are admitted to function in like manner.

It is an object of the present invention to provide a cooling apparatus which is somewhat similar to the apparatus disclosed in the aforesaid patent and which features structure to extend the length of the laminer flow cooling film areas between each annular louver configuration which hug the inside of the burner, to thus reduce the number of annular louvers otherwise required to perform the same degree of film cooling.

SUMMARY OF THE INVENTION

The aforesaid object of extending the length of the cooling film is performed by the apparatus to be described which utilizes stream splitting channels and diverging exit louver channels to form the cooling film. The configuration of the cooling apparatus also lends itself to be economically manufactured, as major components thereof may be formed by virtue of a stamping process. Alternatively, the pattern of the louvers may be formed by rolling the pattern into a first piece of sheet metal and brazing a second piece of sheet metal to the louver pattern.

BRIEF DESCRIPTION OF THE DRAWINGS

Other objects, features and advantages of the present invention will become apparent upon the study of FIG. 1 (partial sectional view) and FIG. 2 (partial plan view), illustrating a preferred configuration of the cooling apparatus of the invention.

Sectional A—A of FIG. 1 lies in a plane passing through central longitudinal combustor axis 9.

DETAILED DESCRIPTION OF THE PREFERRED EMBODIMENT

Figure 1:
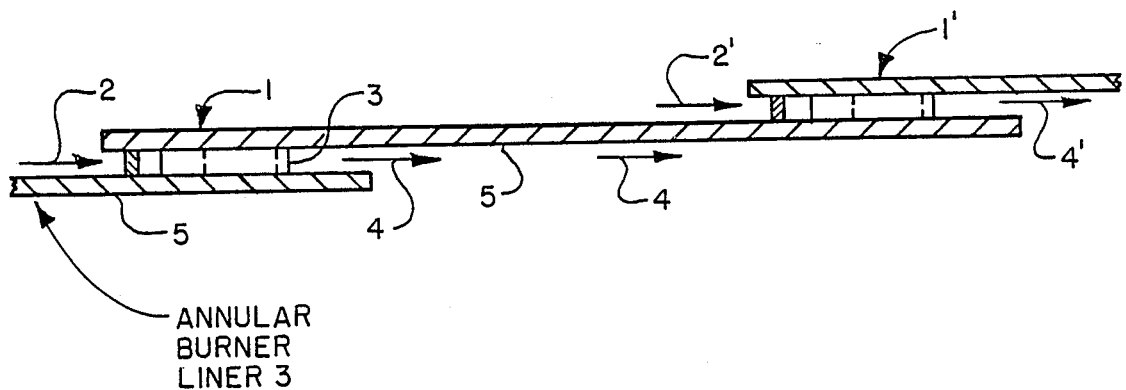
Figure 2:
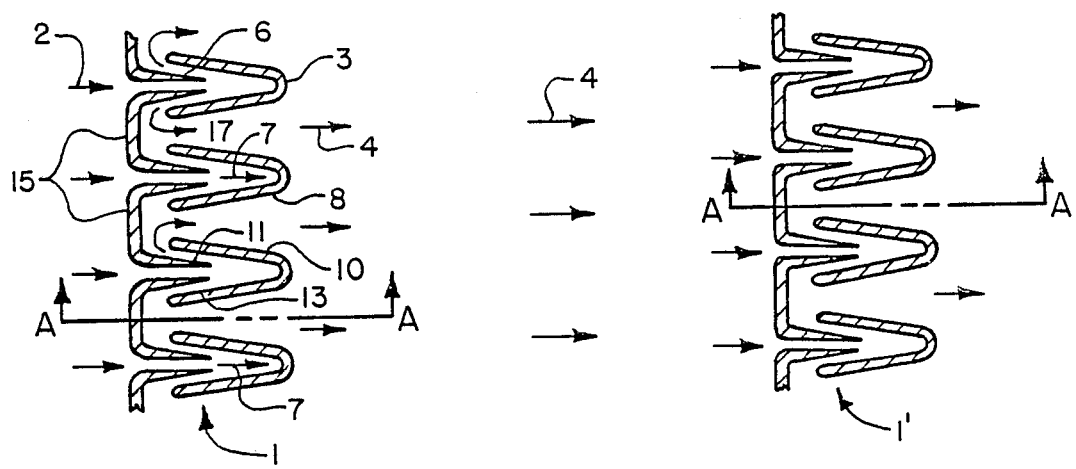

The first array of cooling elements 1 is shown in FIGS. 1 and 2, such elements extending circumferentially all of the way around the aforesaid combustor liner about longitudinal central axis 9. Cooling gas from the compressor is represented by arrows 2 in the figures and passes through nozzles 6, and first streams 7 exit from each nozzle 6 and impinge upon first direction reversal members 3, which straddle each nozzle 6 as shown in FIG. 2. The first stream 7 impinges upon a terminal interior portion of each member 3, to form a second stream 11 and a third stream 13, which are substantially reversed in direction relative to the direction of the first stream emitted at the exit orifice of each nozzle 6. A plurality of second direction reversal elements 15 are positioned between the nozzles, and the second and third streams impinge upon the second direction reversal members 15, and are combined to form fourth streams represented by arrows 4, each fourth stream passing through a diverging channel 17 formed between the first direction reversal members, such channel being formed by first, and second wall portions 8 and 10 as illustrated. The result is the production of a thin laminar cooling film represented by arrows 4 which hugs the inside surface 5 of the combuster as shown in FIG. 1. Each diverging channel formed by the wall portions of adjacent first direction reversal members form an angle preferably between 10 and 15 degrees with respect to the direction of forward motion of the cooling film represented by arrow 4.

The diverging channels, in contrast with the prior art, represented by the aforesaid Dierberger patent, form smooth laminar flow, uniformly distributed, at the undersigned of the liner. Since film turbulence is substantially absent, the forward kinetic energy of the gas in the direction of arrows 4 is enhanced, which enables the film to travel further along the inside surface of the burner, and additionally reduces mixing with the hot gas, which would otherwise reduce the cooling efficiency of the film. A second circumferential array 1' of the aforesaid louver elements is formed within the liner downstream of the film represented by arrows 4, to repeat the process, whereby more cooling air represented by 2' is admitted to form a second laminar film 4' which hugs the inside surface of the combuster as shown in FIG. 1. The composite louver pattern of FIG. 2 is advantageously rolled into a unitary piece of sheet metal, and the second piece of sheet metal may be brazed upon the louver elements thus formed by rolling. Since the cooling film will be effective along a longer segment of the underside of the combuster, it is believed that manufacturing cost may be saved, since a lesser number of annular cooling elements need be formed within the combuster along the longitudinal axis of the combuster.

While the aforesaid apparatus is preferred, other equivalent apparatus may be utilized to practice the invention which is to be restricted only by the language of the following claims and art recognized equivalents thereof.

What is claimed is:

1. Aircraft engine cooling apparatus positioned about a longitudinal central engine axis and employing a cooling gas for cooling a combustor liner comprising:
    (a) a plurality of cooling gas inlet nozzles mounted upon said combustor liner, said nozzle producing first streams of cooling gas at exit orifices thereof moving in a forward direction;
    (b) a plurality of first direction reversal members mounted upon said combustor liner for splitting said first streams into second and third streams straddling said nozzles and substantially reversed in direction relative to the direction of said first streams; and
    (c) a plurality of second direction reversal members mounted upon said combustor liner and positioned between pairs of adjacent nozzles, for causing said gas to exit said apparatus and for again substantially reversing the directions of said second and third streams while combining said second and third streams to form a fourth stream of laminar flow cooling film upon a surface of said combustor liner moving in said forward direction, the aforesaid structure of paragraphs (a), (b), and (c) all being coplanar when viewed through radially extending planes passing through the longitudinal central engine axis, thereby enabling said structure to be economically formed by stamping or rolling.

2. The cooling apparatus of claim 1 wherein adjacent pairs of first direction reversal members have wall portions configured to form gradually diverging channels through which said fourth stream of cooling film moves.

3. The cooling apparatus of claim 2 wherein said wall portions also form converging channels through which said first streams move.

4. The cooling apparatus of claim 2 wherein said wall portions form an angle of between 10 and 15 degrees with respect to the forward direction of motion of said fourth stream of cooling film.

5. The cooling apparatus of claim 3 wherein said wall portions form an angle of between 10 and 15 degrees with respect to the forward direction of motion of said fourth stream of cooling film.

6. Cooling apparatus including a second array of the elements of claim 4 positioned to intercept said fourth stream of laminar flow cooling film.

7. Cooling apparatus including a second array of the elements of claim 5 positioned to intercept said fourth stream of laminar flow cooling film.

8. The cooling apparatus of claim 4 wherein said elements are positioned about the circumference of a jet engine cumbustor.

9. The cooling apparatus of claim 5 wherein said elements are positioned about the circumference of a jet engine cumbustor.

10. The cooling apparatus of claim 6 wherein said elements are positioned about the circumference of a jet engine cumbustor.

* * * * *